(12) United States Patent
Pang et al.

(10) Patent No.: US 8,458,622 B2
(45) Date of Patent: Jun. 4, 2013

(54) PHOTO-MASK ACCEPTANCE TECHNIQUE (75) Inventors: Linyong Pang, Los Gatos, CA (US);
Danping Peng, Fremont, CA (US);
Vikram Tolani, San Jose, CA (US)

(73) Assignee: Luminescent Technologies, Inc., Palo Alto, CA (US)

( * ) Notice: Subject to any disclaimer, the term of this patent is extended or adjusted under 35 U.S.C. 154(b) by 311 days.

(21) Appl. No.: 12/955,569

(22) Filed: Nov. 29, 2010

(65) Prior Publication Data
US 2012/0134542 A1 May 31, 2012

(51) Int. Cl.
*G06F 17/50* (2006.01)

(52) U.S. Cl.
USPC .................. 716/51; 716/50; 716/52; 716/54

(58) Field of Classification Search
USPC .......................................... 716/50, 51, 52, 54
See application file for complete search history.

(56) References Cited

U.S. PATENT DOCUMENTS

| | | | |
|---|---|---|---|
| 5,640,199 A | 6/1997 | Garakani et al. | |
| 6,042,998 A | 3/2000 | Brueck et al. | |
| 6,235,434 B1 | 5/2001 | Sweeney et al. | |
| 6,480,285 B1 | 11/2002 | Hill | |
| 6,484,306 B1 | 11/2002 | Bokor et al. | |
| 6,563,566 B2 | 5/2003 | Rosenbluth et al. | |
| 6,709,792 B2 | 3/2004 | Nakao | |
| 6,871,337 B2 * | 3/2005 | Socha | 716/54 |
| 6,873,720 B2 | 3/2005 | Cai et al. | |
| 6,925,202 B2 | 8/2005 | Karklin et al. | |
| 7,003,755 B2 | 2/2006 | Pang et al. | |
| 7,043,071 B2 | 5/2006 | Qian et al. | |
| 7,057,709 B2 * | 6/2006 | Rosenbluth | 355/69 |
| 7,073,162 B2 | 7/2006 | Cobb et al. | |
| 7,093,226 B2 | 8/2006 | Pang | |
| 7,093,229 B2 | 8/2006 | Pang et al. | |
| 7,107,573 B2 * | 9/2006 | Yamazoe et al. | 430/311 |
| 7,124,394 B1 | 10/2006 | Abrams et al. | |

(Continued)

FOREIGN PATENT DOCUMENTS

| WO | WO 2005/078528 A2 | 8/2005 |
|---|---|---|
| WO | WO 2005/078528 A3 | 8/2005 |

OTHER PUBLICATIONS

Rosenblluth et al.,"Optimum Mask and Source Patterns to Print Given Shape" , Apr. 2002, SPIE Proceedings vol. 4346, pp. 13-30.*

(Continued)

*Primary Examiner* — Sun Lin
(74) *Attorney, Agent, or Firm* — Wilson Sonsini Goodrich & Rosati (57) ABSTRACT

A technique for calculating a second aerial image associated with a photo-mask that can be used to determine whether or not the photo-mask (which may include defects) is acceptable for use in a photolithographic process is described. In particular, using a first aerial image produced by the photo-mask when illuminated using a source pattern and an inspection image of the photo-mask, a mask pattern corresponding to the photo-mask is determined. For example, the first aerial image may be obtained using an aerial image measurement system, and the inspection image may be a critical-dimension scanning-electron-microscope image of the photo-mask. This image, which has a higher resolution than the first aerial image, may indicate spatial-variations of a magnitude of the transmittance of the photo-mask. Then, the second aerial image may be calculated based on the determined mask pattern using a different source pattern than the source pattern.

20 Claims, 6 Drawing Sheets

U.S. PATENT DOCUMENTS

| | | | |
|---|---|---|---|
| 7,152,219 B2 | 12/2006 | Pang | |
| 7,178,127 B2 | 2/2007 | Abrams et al. | |
| 7,231,628 B2 | 6/2007 | Pack et al. | |
| 7,254,251 B2 | 8/2007 | Cai et al. | |
| 7,302,090 B2 | 11/2007 | Kalus et al. | |
| 7,363,611 B2 * | 4/2008 | Rosenbluth | 430/30 |
| 7,384,710 B2 | 6/2008 | Ogawa et al. | |
| 7,403,649 B2 | 7/2008 | Cai et al. | |
| 7,441,227 B2 | 10/2008 | Abrams et al. | |
| 7,480,889 B2 | 1/2009 | Abrams et al. | |
| 7,483,559 B2 | 1/2009 | Luk-Pat et al. | |
| 7,557,921 B1 | 7/2009 | Adel et al. | |
| 7,565,001 B2 | 7/2009 | Cai et al. | |
| 7,571,423 B2 | 8/2009 | Abrams et al. | |
| 7,617,474 B2 | 11/2009 | Pang et al. | |
| 7,646,906 B2 | 1/2010 | Saidin et al. | |
| 7,676,077 B2 | 3/2010 | Kulkarni et al. | |
| 7,689,966 B2 | 3/2010 | Verma et al. | |
| 7,695,876 B2 | 4/2010 | Ye et al. | |
| 7,698,665 B2 | 4/2010 | Abrams et al. | |
| 7,703,049 B2 | 4/2010 | Abrams et al. | |
| 7,703,068 B2 | 4/2010 | Abrams et al. | |
| 7,707,541 B2 | 4/2010 | Abrams et al. | |
| 7,749,666 B2 | 7/2010 | Gassner et al. | |
| 7,757,201 B2 | 7/2010 | Abrams et al. | |
| 7,769,225 B2 | 8/2010 | Kekare et al. | |
| 7,805,700 B2 | 9/2010 | Peng | |
| 7,853,920 B2 | 12/2010 | Preil et al. | |
| 7,921,383 B1 * | 4/2011 | Wei | 716/54 |
| 7,984,391 B2 | 7/2011 | Abrams et al. | |
| 7,992,109 B2 | 8/2011 | Abrams et al. | |
| 7,995,832 B2 | 8/2011 | Xiong et al. | |
| 8,056,021 B2 | 11/2011 | Abrams et al. | |
| 8,057,967 B2 | 11/2011 | Ye et al. | |
| 8,200,002 B2 | 6/2012 | Preil et al. | |
| 8,204,295 B2 | 6/2012 | Preil et al. | |
| 8,208,712 B2 | 6/2012 | Preil et al. | |
| 8,260,032 B2 | 9/2012 | Preil et al. | |
| 8,280,146 B2 | 10/2012 | Preil et al. | |
| 8,285,030 B2 * | 10/2012 | Zhou et al. | 382/144 |
| 8,331,645 B2 | 12/2012 | Preil et al. | |
| 2002/0192578 A1 | 12/2002 | Tanaka et al. | |
| 2003/0103189 A1 | 6/2003 | Neureuther et al. | |
| 2003/0106642 A1 | 6/2003 | Fairbairn et al. | |
| 2004/0008880 A1 | 1/2004 | Horie et al. | |
| 2004/0265707 A1 | 12/2004 | Socha | |
| 2005/0122500 A1 | 6/2005 | Ye et al. | |
| 2005/0168498 A1 | 8/2005 | Granik | |
| 2006/0048089 A1 | 3/2006 | Schwarzband | |
| 2006/0051682 A1 | 3/2006 | Hess et al. | |
| 2006/0062445 A1 | 3/2006 | Verma et al. | |
| 2006/0273242 A1 | 12/2006 | Hunsche et al. | |
| 2007/0105029 A1 | 5/2007 | Ausschnitt | |
| 2007/0133862 A1 | 6/2007 | Gold et al. | |
| 2007/0198963 A1 | 8/2007 | Granik et al. | |
| 2008/0152212 A1 | 6/2008 | Feldman | |
| 2008/0170774 A1 | 7/2008 | Xiong et al. | |
| 2008/0198350 A1 * | 8/2008 | Sugita et al. | 355/46 |
| 2008/0241708 A1 | 10/2008 | Lin et al. | |
| 2010/0135568 A1 | 6/2010 | Preil et al. | |
| 2011/0022994 A1 * | 1/2011 | Hu et al. | 716/55 |
| 2011/0194752 A1 | 8/2011 | Pang | |
| 2011/0229805 A1 | 9/2011 | Wang et al. | |
| 2012/0066651 A1 | 3/2012 | Pang et al. | |
| 2012/0066652 A1 | 3/2012 | Clifford | |
| 2012/0134542 A1 | 5/2012 | Pang et al. | |
| 2012/0137260 A1 | 5/2012 | Pang et al. | |
| 2012/0189187 A9 | 7/2012 | Preil et al. | |
| 2013/0015350 A1 | 1/2013 | Chen et al. | |

OTHER PUBLICATIONS

Chen, C.Y. et al, "Mask defect auto disposition based on aerial image in mask product", Proc. SPIE 7379, 73791F (2009).

Pang, L., et al. "Full Chip Scale Source Mask Optimization (SMO) Implemented through Level Set Methods based Inverse Lithography Technology (ILT) Framework," Luminescent Litho Workshop 2009 Abstract, Apr. 29, 2009 vJM1.

Pang et al., "Considering MEEF in Inverse Lithography Technology (ILT) and Source Mask Optimization (SMO)" SPIE, vol. 7122, 14 pgs., (Oct. 17, 2008).

Xiao et al., "Source Optimization and Mask Design to Minimize MEEF in Low k, Lithography" SPIE, vol. 7028, 11 pgs., (Jun. 9, 2008).

Khan, M. et al., "A Semi-Empirical Resist Dissolution Model for Sub-micron Lithographies", pp. 41-46, by Technical Proceedings of the 1998 International Conference on Modeling and Simulation of Microsystems, 1998.

Pang, L. et al., "Computational Lithogaphy & Inspection (CLI) and its Applications in Mask Inspection, Metrology, Review, and Repair," Luminescent Technologies Inc., Palo Alto, CA, Sep. 28, 2010.

J.A. Sethian and D. Adalsteinsson, "An overview of level set methods for etching, deposition, and lithography development", IEEE Trans. on Semiconductor Manufacturing, vol. 10, No. 1, pp. 1-30, Jan. 8, 1996.

* cited by examiner

INVERSE
OPTICAL
CALCULATION
300

FIG. 3

FORWARD
OPTICAL
CALCULATION
400

PHOTO-MASK ACCEPTANCE TECHNIQUE

BACKGROUND OF THE INVENTION

1. Field of the Invention

The present invention relates to techniques for inspecting and qualifying a photo-mask. More specifically, the invention relates to a technique for determining whether or not a photo-mask is acceptable by performing a calculation using an aerial image associated with the photo-mask and an inspection image of the photo-mask.

2. Related Art

Photolithography is a widely used technology for producing integrated circuits. In this technique, a light source illuminates a photo-mask. The resulting spatially varying light pattern is projected on to a photoresist layer on a semiconductor wafer by an optical system (referred to as an 'exposure tool'). By developing the 3-dimensional pattern produced in this photoresist layer, a layer in the integrated circuit is created. Furthermore, because there are often multiple layers in a typical integrated circuit, these operations may be repeated using several photo-masks to produce a product wafer.

Unfortunately, as dimensions in integrated circuits steadily become a smaller fraction of the wavelength of the light used to expose images of the photo-mask onto the wafer, the structures in or on the ideal photo-mask (which corresponds to a 'target mask pattern') and/or the physical structures in or on the actual photo-mask (which corresponds to a fabricated 'mask pattern') bear less and less resemblance to the desired or target pattern at the wafer. These differences between the target mask pattern and the target pattern are used to compensate for the diffraction and proximity effects that occur when light is transmitted through the optics of the exposure tool and is converted into the 3-dimensional pattern in the photoresist.

From a photo-mask or reticle manufacturing standpoint, the increasing dissimilarity between the photo-mask and the corresponding wafer patterns creates a broad new class of problems in photo-mask inspection and qualification. For example, if a defect in a photo-mask is detected, it is often unclear what impact this defect will have on the final pattern in the photoresist. In addition, photo-mask inspection devices often have a different numerical aperture, a different illumination configuration (or 'source aperture,' which is also referred to as a 'source pattern'), and even different light wavelength(s) than those used in the wafer exposure tool. As a consequence, the image measured by a photo-mask inspection tool is often neither a perfect replica of the physical photo-mask nor the pattern (i.e., the aerial image) that will be exposed onto the wafer.

One existing approach to the former challenge uses a computer to simulate the resulting wafer pattern based on the optical inspection images of the photo-mask. By comparing simulations of wafer patterns corresponding to the ideal photo-mask (i.e., the target mask pattern) and an estimate of the actual photo-mask corresponding to the optical inspection images of the photo-mask, the significance of the defect may be determined. However, since the optical inspection images of the photo-mask may not be an accurate representation of the actual photo-mask, errors may be introduced when simulating wafer patterns, and thus, when trying to identify or classify defects. This may further complicate photo-mask inspection and qualification.

Hence, what is needed is a photo-mask inspection and qualification technique that overcomes the problems listed above.

SUMMARY OF THE INVENTION

The present disclosure relates to a computer system for calculating an aerial image. During operation, the computer system receives a first aerial image associated with a photo-mask illuminated by a first source pattern, where the photo-mask corresponds to a mask pattern, and the photo-mask can include defects. Then, the computer system determines the mask pattern based on the first aerial image and a first inspection image of the photo-mask, where the first inspection image has a higher resolution than the first aerial image, and the first inspection image includes a spatial-variation of a magnitude of the transmittance of the photo-mask. Next, the computer system calculates a second aerial image based on the determined mask pattern and a second source pattern that illuminates the determined mask pattern in the calculations, where the second source pattern is different from the first source pattern.

Note that the first aerial image may be associated with an aerial image measurement system. Moreover, the first aerial image may be measured under conditions associated with a photolithographic process, and the second aerial image may be calculated using the same conditions. Additionally, the first inspection image may include a critical-dimension scanning-electron-microscope (CD-SEM) image of the photo-mask.

In some embodiments, the determined mask pattern includes transmission and phase information.

In some embodiments, the first source pattern is one of a predefined group of source patterns, and the second source pattern is an arbitrary source pattern. Moreover, the second source pattern may include a pixilated source pattern.

Furthermore, the defects may include a deviation in a magnitude and/or a phase of the transmittance of the photo-mask from that associated with a target mask pattern that excludes the defects.

In some embodiments, the mask pattern is determined using an inverse optical calculation based on information about optical path associated with an imaging system that measured the first aerial image. Furthermore, the second aerial image may be calculated using a forward optical calculation based on the information about optical path.

Note that in some embodiments the mask pattern is determined based on the target mask pattern, for example, either in conjunction with or instead of the first inspection image. Alternatively or additionally, the second aerial image may be determined based on a forward optical calculation associated with a recovered inspection image. This recovered inspection image may be determined from a second inspection image associated with the photo-mask and the target mask pattern. Furthermore, the recovered inspection image may be characterized by additional spatial frequencies than the second inspection image. Note that the second inspection image may have a lower resolution than the first inspection image. Moreover, the recovered inspection image may be determined using an inverse optical calculation based on information about optical path associated with an imaging system that measured the second inspection image.

In some embodiments, the computer system calculates an estimated resist pattern based on the second aerial image and a model of a photoresist in the photolithographic process. Furthermore, the computer system may identify differences between the estimated resist pattern and a target pattern (such as a desired developed pattern on a semiconductor die or wafer), and may determine an acceptance condition of the photo-mask based on the identified differences. However, in some embodiments the acceptance condition is determined without calculating the estimated resist pattern. Therefore, in these embodiments the computer system may identify differences between the second aerial image and the target pattern, and may determine the acceptance condition of the photo-mask based on the identified differences.

Furthermore, in some embodiments the computer system receives a set of first aerial images, which include the first aerial image. This set of first aerial images may be associated with different focal conditions in the imaging system that measured the set of first aerial images, and the mask pattern may be determined using the set of first aerial images. In particular, the set of first aerial images may be used to determine a spatial-variation of a phase of the transmittance of the photo-mask.

Another embodiment provides a method including at least some of the above-described operations.

Another embodiment provides a computer-program product for use in conjunction with the computer system.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

Note that like reference numerals refer to corresponding parts throughout the drawings. Moreover, multiple instances of the same part are designated by a common prefix separated from an instance number by a dash.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of a computer system, a method, and a computer program product (i.e., software) for use with the computer system are described. These devices and processes may be used to calculate a second aerial image associated with a photo-mask that, in turn, can be used to determine whether or not a photo-mask (which may include defects) is acceptable for use in a photolithographic process. In particular, using a first aerial image produced by the photo-mask when illuminated using a source pattern (and using conditions associated with the photolithographic process) and an inspection image of the photo-mask, a mask pattern corresponding to the photo-mask is determined. For example, the first aerial image may be obtained using an aerial image measurement system, and the inspection image may be a critical-dimension scanning-electron-microscope (CD-SEM) image of the photo-mask. This image, which has a higher resolution than the first aerial image, may indicate spatial-variations of a magnitude of the transmittance of the photo-mask. Then, the second aerial image may be calculated based on the determined mask pattern using a different source pattern than the source pattern, and either the same or different conditions associated with the photolithographic process.

By calculating the second aerial image using a different source pattern (and, more generally, an arbitrary source pattern), this calculation technique may facilitate qualification of the photo-mask using source patterns that are often unavailable in existing photo-mask inspection systems, but which are of increasing interest as the source pattern is optimized along with the mask pattern to produce a desired target pattern on a wafer (or semiconductor die) with ever smaller critical dimensions. For example, an acceptance condition of the photo-mask may be determined by identifying differences between the second aerial image and the target pattern. Alternatively or additionally, an estimated resist pattern developed on the wafer may be calculated based on the second aerial image and a model of a photoresist in the photolithographic process, and the acceptance condition of the photo-mask may be determined by identifying differences between the estimated resist pattern and the target pattern. Thus, the calculation technique may facilitate qualification of the photo-mask under realistic conditions (such as those used in the photolithographic process), which may improve the accuracy of the acceptance condition. As a consequence, the calculation technique may improve the quality of accepted photo-masks and, therefore, may improve the yield and reduce the cost of photo-masks, as well as wafers produced using the photolithographic process.

In the discussion that follows, a photo-mask should be understood to include: a chromium-on-glass photo-mask, an alternating phase-shifting photo-mask, an attenuating phase-shifting photo-mask, and/or multiple-exposure photo-masks (e.g., where patterns printed or a wafer or semiconductor die using two or more photo-masks are combined to produce a desired or target pattern, such as a portion of an integrated circuit). Furthermore, a mask pattern should be understood to include the pattern of spatially varying transmittance magnitude and/or transmittance phase in a given photo-mask. Note that, typically, the manufactured or fabricated mask pattern in a given photo-mask deviates from an ideal target mask pattern, for example, because of defects that can occur during the photo-mask fabrication process.

In addition, in the discussion that follows note that an image and/or a pattern may include a bitmap or grayscale file that includes a set of values corresponding to pixels in the image and/or the pattern. Furthermore, the quantization (i.e., the number of bits) in these files may be varied, as needed, during the measurements and calculations that are described. Alternative formats having the same or similar information content, including a vector-based format such as a Graphic Design System II (GDSII) and/or an OASIS format, may be used in some embodiments of the images and/or patterns. And in some embodiments, the images and/or patterns include real and imaginary components (or equivalently, magnitude and phase information).

Figure 1:
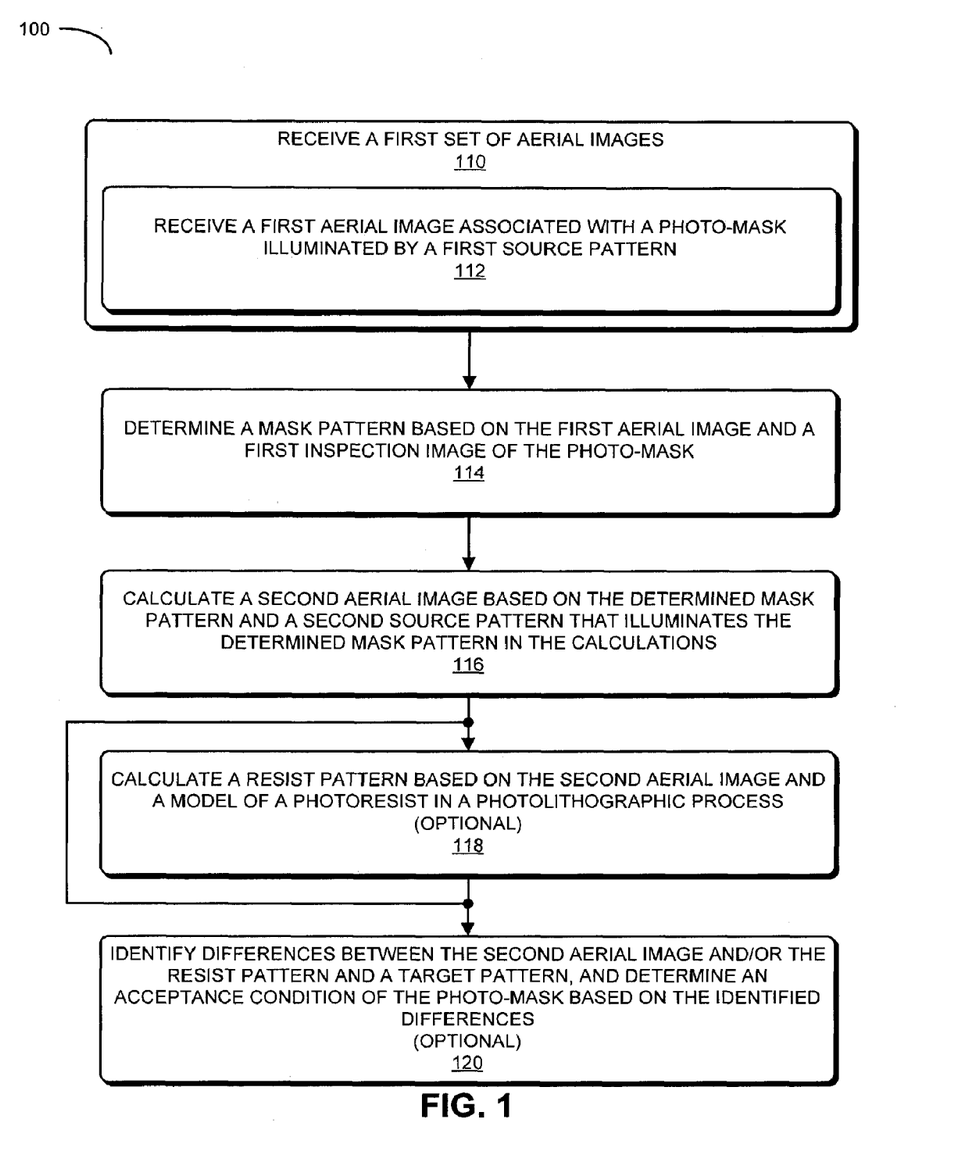
FIG. 1 is a flow chart illustrating a process for calculating an aerial image in accordance with an embodiment of the present invention.

We now describe embodiments of the calculation technique. FIG. 1 presents a flow chart illustrating a process 100 for calculating an aerial image, which is performed by a computer system (such as computer system 600 in FIG. 6). During operation, the computer system receives a first aerial image associated with a photo-mask illuminated by a first source pattern (operation 112), where the photo-mask corresponds to a mask pattern, and the photo-mask can include defects. For example, the first aerial image may be associated with an aerial image measurement system (AIMS). Moreover, the first aerial image may be measured under conditions associated with a photolithographic process (such as immersion optics, a disk illumination with a sigma of 0.75, a numerical aperture of 1.35, a wavelength of 193 nm, etc.). Note that the defects may include a deviation in a magnitude and/or a phase of the transmittance of the photo-mask from that associated with a target mask pattern that excludes the defects. Thus, the defects may include hard defects (such as chromium defects) and/or soft defects (such as dirt or contamination).

Then, the computer system determines the mask pattern based on the first aerial image and a first inspection image of the photo-mask (operation 114), where the first inspection image has a higher resolution than the first aerial image, and the first inspection image includes a spatial-variation of a magnitude of the transmittance of the photo-mask. For example, the first inspection image may include a CD-SEM image. Alternatively or additionally, in some embodiments the target mask pattern may be used in conjunction with or instead of the first inspection image (this may be useful if the first inspection image is unavailable.) Note that the mask pattern may be determined using an inverse optical calculation based on information about optical path associated with an imaging system that measured the first aerial image (such as AIMS). Furthermore, in some embodiments the determined mask pattern includes transmission and phase information.

Next, the computer system calculates a second aerial image based on the determined mask pattern and a second source pattern that illuminates the determined mask pattern in the calculations (operation 116), where the second source pattern is different from the first source pattern (but other conditions associated with the photolithographic process may be unchanged). For example, the second aerial image may be calculated using a forward optical calculation based on the information about optical path associated with the imaging system that measured the first aerial image. Furthermore, the first source pattern may be one of a predefined group of source patterns (such as annular, quadrupole, etc.), and the second source pattern may be an arbitrary source pattern. Additionally, the second source pattern may include a pixilated source pattern. Consequently, the calculation technique may facilitate analysis of the impact of the mask pattern at a wafer or semiconductor die using an arbitrary or free-form source pattern (as opposed to a predefined source pattern) and, therefore, may facilitate the use of source-mask optimization in the design of the source pattern and the target mask pattern to fabricate a target pattern on the wafer (such as a desired developed pattern on the semiconductor die or wafer).

In particular, the computer system may optionally calculate an estimated resist pattern based on the second aerial image and a model of a photoresist in a photolithographic process (operation 118), such as a model of a positive or a negative resist. Alternatively or additionally, the computer system may optionally identify differences between the estimated resist pattern and the target pattern, and may determine an acceptance condition of the photo-mask based on the identified differences (operation 120). However, in some embodiments the acceptance condition is determined without calculating the estimated resist pattern. In these embodiments, the computer system may optionally identify differences between the second aerial image and the target pattern, and may determine the acceptance condition of the photo-mask based on the identified differences (operation 120).

In some embodiments, the deviations in the phase of the transmittance of the photo-mask may be provided by a set of first aerial images that are determined at different focal conditions in the imaging system that measured the first aerial image (such as different image planes or surfaces in the imaging system). More generally, aerial images in the set of first aerial images may be obtained using different imaging conditions, such as: different wavelengths, different focal conditions, different illumination types (such as annular, quadrupole, immersion, etc.), different measurement techniques, etc. Therefore, in some embodiments the computer system optionally receives a set of first aerial images (operation 110), which include the first aerial image. This set of first aerial images may be used to determine the mask pattern. In particular, the set of first aerial images may be used to determine a spatial-variation of the phase of the transmittance of the photo-mask.

Alternatively or additionally, the second aerial image may be, at least in part, determined based on a forward optical calculation associated with a recovered inspection image. This recovered inspection image may be determined from a second inspection image associated with the photo-mask and the target mask pattern. Furthermore, the recovered inspection image may be characterized by additional spatial frequencies than the second inspection image. Note that the second inspection image may have a lower resolution than the first inspection image. Moreover, the recovered inspection image may be determined using an inverse optical calculation based on information about optical path associated with another imaging system that measured the second inspection image (such as the TeraScan™ photo-mask inspection system from KLA-Tencor, Inc., of San Jose, Calif.).

In some embodiments of method 100 there may be additional or fewer operations. Moreover, the order of the operations may be changed, and/or two or more operations may be combined into a single operation.

Figure 2:
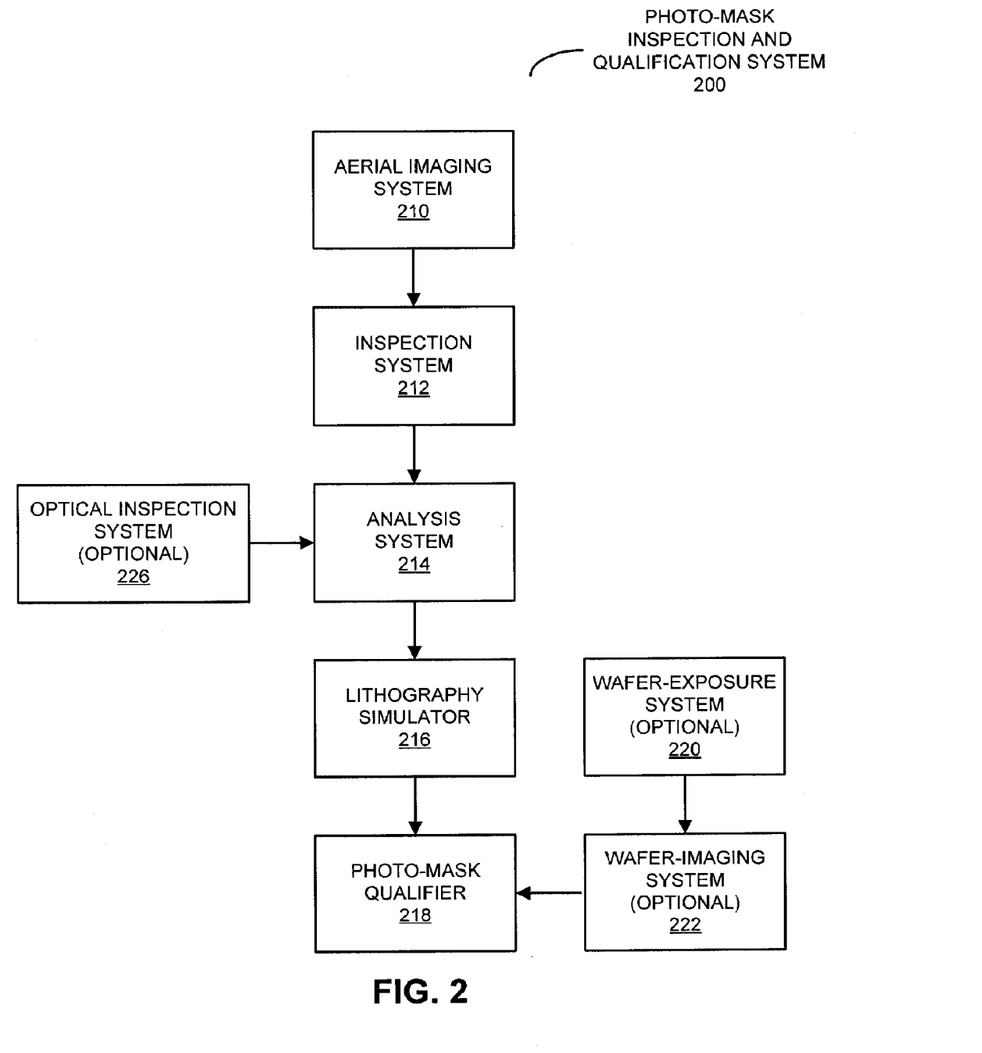
FIG. 2 is a block diagram illustrating a photo-mask inspection and qualification system in accordance with an embodiment of the present invention.

FIG. 2 presents a block diagram illustrating a photo-mask inspection and qualification system 200. In this system, one or more aerial images associated with the photo-mask (such as the first aerial image or the set of first aerial images) are measured using an aerial imaging system 210. For example, aerial imaging system 210 may measure the one or more aerial images when the photo-mask is illuminated by the first source pattern and under conditions associated with a photolithographic process (thus, aerial imaging system 210 may emulate a real exposure tool, including: the numerical aperture, the type of illumination, the wavelength, etc.). As noted previously, multiple aerial images measured at different focal conditions in aerial imaging system 210 may provide information about the spatial-variation of the phase of the transmittance of the photo-mask. In some embodiments, it is assumed that a phase defect in the photo-mask has one of a few discrete possible phase values, such as 90°, 180° or 270°.

Furthermore, the first inspection image of the photo-mask may be measured using inspection system 212. For example, inspection system 212 may be a scanning electron microscope that measures a CD-SEM image of the photo-mask, which may have a higher resolution than that used in the photolithographic process. As noted previously, the CD-SEM image may provide information about the spatial-variation of the magnitude of the transmittance of the photo-mask.

Then, an analysis system 214 determines the mask pattern based on the one or more aerial images and the first inspection image. In some embodiments, the mask pattern is further determined based on a target mask pattern. As noted previously, and described further below with reference to FIG. 3, in some embodiments the mask pattern is determined using an inverse optical calculation based on information about optical path associated with aerial imaging system 210.

Next, a lithography simulator 216 calculates the second aerial image based on the determined mask pattern and the second source pattern that 'illuminates' the determined mask pattern during the calculation, and which is different from the first source pattern. (Alternatively, lithography simulator 216 may calculate the second aerial image based on the source pattern, the target mask pattern and a mask-defect pattern, which was determined by comparing the target mask pattern and the determined mask pattern.) As noted previously, and described further below with reference to FIG. 4, in some embodiments the second aerial is calculated using a forward optical calculation based on the information about optical path associated with aerial imaging system 210. Furthermore, in some embodiments lithography simulator 216 may calculate an estimated resist pattern based on the second aerial image and the model of the photoresist in the photolithographic process. Thus, in some embodiments lithography simulator 216 calculates a simulated or estimated wafer pattern that can be produced in the photolithographic process.

Additionally, photo-mask qualifier 218 may identify a difference(s) between the second aerial image and/or the estimated resist pattern and the target pattern, and may determine an acceptance condition of the photo-mask based on the identified difference(s). For example, photo-mask qualifier 218 may analyze the second aerial image and/or the estimated resist pattern to determine if it is acceptable, e.g., if differences with respect to the target pattern and/or any defects that are present are within acceptable bounds, such as a fraction of a critical dimension in the target pattern. (In embodiments where the second aerial image is used, this may involve prior correlation with the critical dimension(s) of a test wafer.) If yes, the photo-mask may be accepted, and if no, the photo-mask may be rejected, subject to rework, or subject to additional qualification testing. Note that, in some embodiments, photo-mask acceptance is also based, at least in part, on a comparison of the determined mask pattern and at least a portion of the target mask pattern for the same or a different photo-mask (which is sometimes referred to as 'die-to-database inspection').

In some embodiments, the photo-mask is accepted (or not) based on a process window (such as a range of exposure times, a depth of focus, a range of exposure intensities, and/or a normalized image log slope) associated with the determined mask pattern. In this way, a particular defect that is fatal when slightly overexposed may be identified, even though it is negligible at the nominal dose. In addition, in some embodiments the photo-mask is accepted (or not) based on features in the second aerial image and/or the estimated resist pattern that are identified over or throughout the process window, and/or based on an impact on a critical dimension across the process window. Note that acceptance of the photo-mask may be fully automated, while in other embodiments it may not be fully automated. Thus, information (such as identified differences or features) may be presented to an operator, who may verify an acceptance recommendation made by photo-mask inspection and qualification system 200 (FIG. 2) or who may independently determine whether or not to accept the photo-mask.

Alternatively or additionally, the photo-mask may be qualified based on comparisons between the estimated resist pattern and actual patterned wafer patterns produced or generated using the photo-mask. For example, an optional wafer-exposure system 220 (such as a photolithographic exposure tool) may be used to produce a printed wafer using the photo-mask, and a printed wafer image of the pattern on the printed wafer may be determined using an optional wafer-imaging system 222 (such as the PUMA™ patterned wafer-inspection platform from KLA-Tencor, Inc., of San Jose, Calif.). However, this brute-force approach is often expensive and time consuming. In addition, errors introduced in the photolithographic process in optional wafer-exposure system 220 may reduce the accuracy of the qualification decision made by photo-mask qualifier 218.

Thus, the calculation technique may overcome the limitations of aerial imaging system 210, for example, by providing a low-cost and efficient technique for determining whether or not the photo-mask (including any defects) is acceptable in conjunction with an arbitrary source pattern (such as a pixilated source pattern), which can be difficult to implement using AIMS. Therefore, the calculation technique may improve photo-mask and/or wafer yield, and thus may decrease the cost and time to market of photo-masks and integrated circuits.

In some embodiments, analysis system 214 is used to recover lost information in an inspection image (for example, due to a finite numerical aperture in an optional optical-inspection system 226) and/or to correct for image artifacts, such as those due to focal errors and/or optical aberrations. In particular, optional optical-inspection system 226 (such as the TeraScan™ photo-mask inspection system) may determine the second inspection image of the photo-mask. Then, analysis system 214 may determine a recovered inspection image based on the second inspection image, the target mask pattern and information about optical path associated with optional optical-inspection system 226. This recovered inspection image may be characterized by additional spatial frequencies than the second inspection image. For example, the recovered inspection image may be determined using an inverse optical calculation based on the information about optical path associated with optional optical-inspection system 226. Note, however, that this inverse optical calculation may be difficult when there are defects in the photo-mask because of the lower resolution of the second inspection image.

In this way, lithography simulator 216 may be able to use the second inspection image to calculate the second aerial image, even though the second inspection image may have a lower resolution that the first inspection image. In particular, in some embodiments lithography simulator 216 uses the recovered inspection image (in conjunction with or separately from the determined mask pattern) in a forward optical calculation to calculate the second aerial image and/or the estimated resist pattern.

Figure 3:
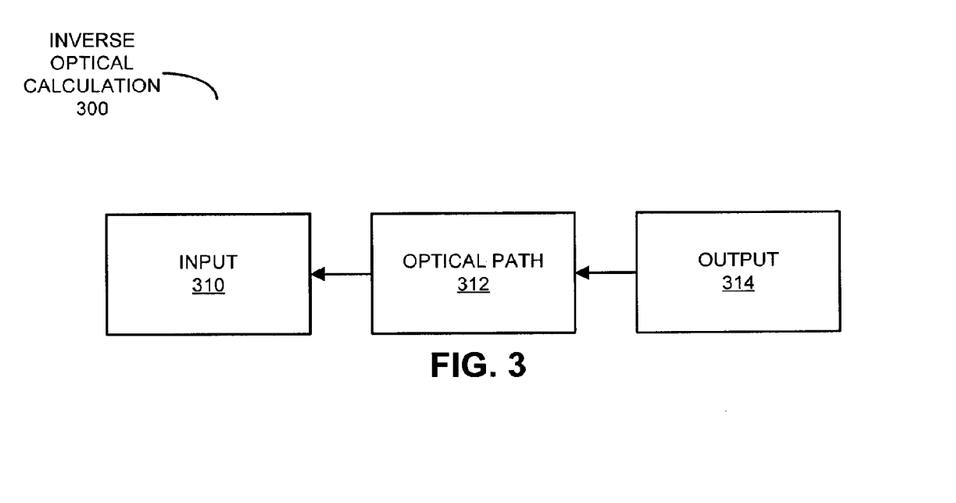
FIG. 3 is a block diagram illustrating an inverse optical calculation in accordance with an embodiment of the present invention.

FIG. 3 presents a block diagram illustrating an inverse optical calculation 300. In this calculation, a predicted input 310 (such as a predicted pattern or an image) at an object plane of optical path 312 is determined based on an output 314 (such as a pattern or an image) at an image plane of optical path 312. For example, the mask pattern at the object plane may be determined from the first aerial image using information about the magnitude and/or the phase of the transmittance of the photo-mask, as well as using information about the optical path in aerial imaging system 210 (FIG. 2). In some embodiments, this inverse optical calculation is also based on the target mask pattern at the object plane. Note that information about optical path 312 may include illumination and/or optical effects.

Figure 4:
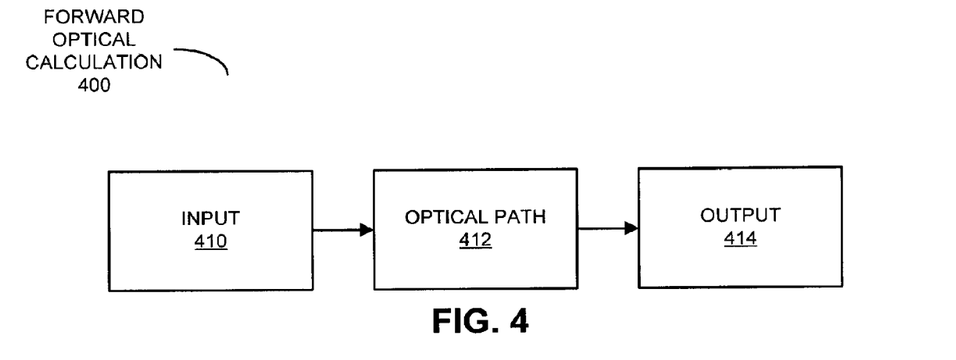
FIG. 4 is a block diagram illustrating a forward optical calculation in accordance with an embodiment of the present invention.

In another example, the recovered inspection image of the photo-mask at the object plane is determined from the second inspection image at the image plane and the target mask pattern at object plane, as well as from information about the optical path in optional optical-inspection system 226 (FIG. 2). In particular, $$R = I^{-1} IM,$$

where I is a forward optical path (described with reference to FIG. 4 below), $I^{-1}$ is an inverse optical path operator, M is the actual (physical) mask pattern, and the application of I to M is the first inspection image, and R is the recovered inspection image. As noted previously, the recovered inspection image may be characterized by additional spatial frequencies than the second inspection image (e.g., it includes additional magnitude and/or phase information at one or more additional spatial frequencies). For example, if the second inspection image is characterized by a band of spatial frequencies, the recovered inspection image may be characterized by another band of spatial frequencies that includes the band of spatial frequencies, and which approximately equals the band of spatial frequencies associated with the photo-mask.

While the preceding discussion illustrates the inverse optical calculation using a single output 314, in other embodiments two or more patterns at image plane(s) of optical path 312 may be used. For example, instead of the second inspection image, there may be a set of second inspection images that are each determined using different wavelengths, different focal conditions (e.g., on different focal surfaces or planes), and/or different imaging conditions in optional optical-inspection system 226 (FIG. 2). These inspection images may include magnitude and/or phase information. For example, images that include magnitude and relative phase information may be measured by generating an interference pattern using measurement and reference beams derived from a common light source or that are spatially and temporally coherent. Alternatively, phase contrast optics may be utilized. In some embodiments, the difference of two patterns at image plane(s) may be used in the inverse optical calculation 300. Furthermore, in some embodiments each of the patterns at the image plane(s) used in the inverse optical calculation 300 or a term(s) including some combination of the patterns at the image plane(s) may be multiplied by a corresponding weight. In this way, inverse optical calculation 300 may emphasize one or more of the patterns at an image plane relative to other patterns (at the same or other image planes) used in inverse optical calculation 300.

In some embodiments, inverse optical calculation 300 is based on iterative minimization of an error function (H), which is also sometimes referred to as a 'cost function' or a 'Hamiltonian function.' In particular, during each iteration of inverse optical calculation 300 the error function may be a function of the difference between output 314 and a pattern (or image) that results when input 310 is projected through optical path 312. In some embodiments, input 310 initially corresponds to the target mask pattern, and as the calculation progresses this pattern is allowed to evolve while output 314 is held constant. In embodiments with multiple patterns (or images) at object plane(s) and/or image plane(s), the error function (H) equals $$\sum_{j=1}^{N} w_j |I_j - I_{oj}|^n,$$

where $I_j$ is the forward projection of the jth pattern at the object plane (out of N patterns in this example) through optical path 312, $w_j$ is a corresponding weight, $I_{oj}$ is the jth pattern at an image plane, and n is a power. Note that the error function (H) approaches zero as $I_j$ approaches $I_{oj}$.

In an exemplary embodiment, N is 3 and n is 2. Three patterns (or images) at the image plane(s) may be determined at three different focal conditions (or focus settings) in aerial imaging system 210 (FIG. 2) or optional optical-inspection system 226 (FIG. 2). For example, with a wavelength of 260 nm, the focal conditions may be at −600 nm (relative to nominal focus), at 0 nm (i.e., at nominal focus), and 600 nm (relative to nominal focus). Alternatively or in addition, the three patterns at the image plane(s) may be determined at three different wavelengths or imaging conditions. Furthermore, a corresponding set of weights $\{w_j\}$ may be 1, 0.1, and 1.

In other embodiments, the weights are varied as inverse optical calculation 300 progresses and/or different weights are used for specific parts (or even pixels) of a pattern. For example, the weights may be determined based on the difference between $I_j$ and $I_{oj}$ at a given step in inverse optical calculation 300. This approach may exaggerate the features or defects, especially when inverse optical calculation 300 is close to a local or global minimum and the error function (H) corresponds to small differences. Thus, in general the error function (H) may be expressed as a double integral over the pattern or image area and there may be separate time-dependent weights for $I_j$ and $I_{oj}$. Furthermore, in some embodiments the error function (H) is expressed as a relative difference between $I_j$ and $I_{oj}$ for at least a portion of inverse optical calculation 300 as it progresses.

It will be recognized by one of ordinary skill in the art that inverse optical calculation 300 described above is poorly defined. In particular, numerous possible patterns at the object plane may result from the same observed output 314. Therefore, input 310 may be selected such that it is 'most likely' to represent the actual photo-mask. A variety of constraints and additional criteria may be imposed when determining the solution(s) to this problem in order to find a unique answer(s). For example, input 310 may be that which has the smallest value of the error function (H).

Other constraints based on a priori knowledge of the photo-mask manufacturing process may also be applied to resolve the ambiguity among several competing candidate defect possibilities (i.e., different possible solutions for input 310). For example, there may be a priori knowledge about typical defect types (including the distribution of defect sizes and phases) that arise during the photo-mask manufacturing process. In addition, information may also be obtained from neighboring defects on the photo-mask that is being inspected, or from previous photo-masks that were manufactured on the same process line and inspected. For example, given the likelihood that point defects tend to be generated by common mechanisms, a common link between more than one such defect may constrain the possible solution options in inverse optical calculation 300.

One common type of defect is known as a critical dimension (CD) defect or a sizing error. This type of defect is not an isolated feature (i.e., a feature where one does not belong), or a missing feature (i.e., where one was expected), but rather an error in the dimension of the feature being patterned on the photo-mask. In addition, the large mask error enhancement factors (MEEFs) of leading-edge lithographic processes makes it important to understand how such observed CD defects on or in photo-masks impact wafer manufacturing (i.e., the printed patterns on wafers). The calculation technique is well suited to identifying and assessing the impact (i.e., the significance) of these and other defects in the photo-masks.

FIG. 4 presents a block diagram illustrating a forward optical calculation 400. In this calculation, a suitable illuminated input 410 (such as a pattern or an image) at an object plane of optical path 412 is used to determine a predicted output 414 (such as a pattern or an image) at an image plane of optical path 412. For example, using the determined mask pattern, the second source pattern, and information about optical path associated with aerial imaging system 210 (FIG. 2), the second aerial image can be determined. Note that optical path 412 may be different than optical path 312 (FIG. 3). In general, information about optical path 412 may include some or all of the aspects of the photolithographic process, such as illumination settings, the electromagnetics of the photo-mask, the exposure-tool optics, etc. In addition, in some embodiments forward optical calculation 400 models the effect of a photoresist, including flare and/or etch effects.

Note that calculations corresponding to one or more optical paths in inverse optical calculation 300 (FIG. 3) and/or forward optical calculation 400 may be implemented using Fourier-optical techniques. Furthermore, the optical paths in inverse optical calculation 300 (FIG. 3) and/or forward optical calculation 400 may include multiple models of optical paths (such as when the set of second inspection images includes inspection images from two or more different optical-inspection devices), which are then used to determine the recovered inspection image. Also note that while optical path 312 (FIG. 3) and optical path 412 have been traversed in particular directions, each of these optical paths may be traversed in either direction.

Figure 5:
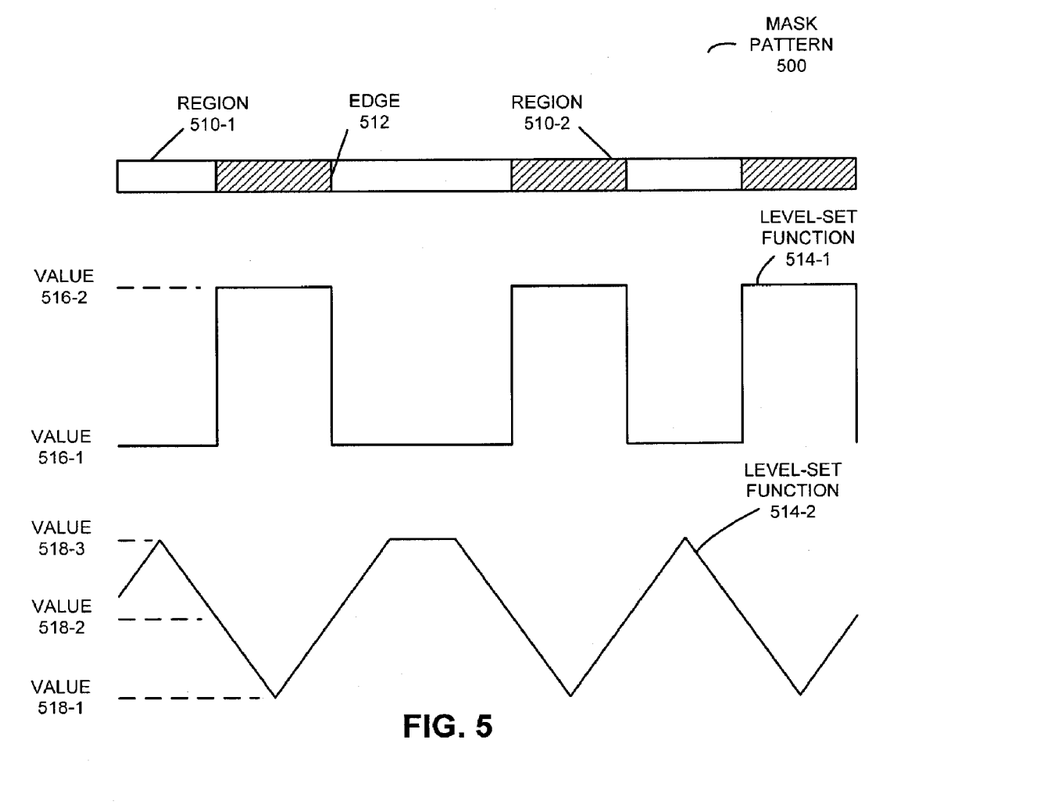
FIG. 5 illustrates a mask pattern and corresponding level-set functions in accordance with an embodiment of the present invention.

We now describe an exemplary embodiment of the forward optical calculation or forward projection operation used to calculate the second aerial image and/or the estimated resist pattern. For simplicity, coherent illumination of the estimated photo-mask is utilized. Furthermore, the electric field falling upon the photo-mask is approximately constant. Thus, the clear regions of the photo-mask pass the light, while the opaque regions block the light. It follows that a scalar electric field E, just behind the photo-mask, may be expressed as $$E(\vec{r}) = \begin{Bmatrix} 0 & \text{chrome} \\ 1 & \text{glass} \end{Bmatrix},$$

where F=(x, y) is a point on the (x, y) plane. As discussed below with reference to FIG. 5, this representation of the photo-mask may be re-expressed using a function φ (referred to as a level-set function) having positive regions that indicate glass and negative regions that indicate chrome. Furthermore, the level-set function may equal zero at the boundaries or contours of the photo-mask. Therefore, the electric field E associated with the photo-mask may be re-expressed as a function of this level-set function, i.e., $$E(\vec{r}) = \hat{h}(\phi(x, y)),$$

where ĥ is the Heaviside function $$\hat{h}(x) = \begin{Bmatrix} 1 & x \geq 0 \\ 0 & x < 0 \end{Bmatrix}.$$

Since an ideal diffraction limited lens acts as a low-pass filter, this may be used as an approximation to the actual (almost but not quite perfect) lens in the optical path of aerial imaging system 210 in FIG. 2 (in this example). Mathematically, the action of the lens may be expressed as $$A(\vec{r}) = f^{-1}(\hat{C}(f(E(\vec{r}))))$$

where A($\vec{r}$) indicates the electric field distribution on the wafer, f indicates the Fourier transform, $f^{-1}$ indicates the inverse Fourier transform, and Ĉ indicates the pupil cutoff function, which is zero for frequencies larger than a threshold determined by the numerical aperture of the lens, and one otherwise. Thus, the pupil function is $$\hat{C}(k_x, k_y) = \hat{h}(k_{max}^2 - [k_x^2 + k_y^2]) = \begin{Bmatrix} 0 & k_x^2 + k_y^2 \geq k_{max}^2 \\ 1 & k_x^2 + k_y^2 < k_{max}^2 \end{Bmatrix},$$

wherein $k_x, k_y$ and $k_{max}$ represent frequency coordinates in Fourier space. Therefore, the second aerial image (at the detector in aerial imaging system 210 in FIG. 2) is simply the square of the electric field $$I(\vec{r}) = |A(\vec{r})|^2.$$

Combining these two equations, we find $$F(\phi(x,y)) = (|f^{-1}(\hat{C}(f(\hat{h}(\phi(x,y)))))|^2).$$

This is a self-contained formula for the first aerial image seen by the aerial imaging system 210 (FIG. 2).

Note that this is just one embodiment of the forward projector that can be used within the scope of this disclosure, chosen by way of example due to its relative simplicity. More sophisticated forward models also fall within the scope of the present disclosure. Such models may take into account, by way of example but not limitation, various illumination conditions (e.g., off-axis, incoherent), the actual electromagnetics of the light field interacting with the photo-mask, various types of photo-masks other than chrome on glass (e.g., attenuated phase shifting, strong phase shifting, other materials, etc.), the polarization of the light field, the actual properties of the lens (such as aberrations), and/or the vector nature of the electromagnetic field as it propagates through the optical path.

We now describe the level-set functions in more detail. As noted previously, the mask pattern or the recovered inspection image being determined in inverse optical calculation 300 may be represented as a function having a set of values that is larger than those in the first aerial image or the second inspection image. In some embodiments, the function is a level-set function. This is illustrated in FIG. 5, which provides a mask pattern 500 and corresponding level-set functions 514. This mask pattern includes alternating regions with glass (510-1) and chromium (510-2). Transitions from one region to another are characterized by a contour or an edge, such as edge 512. When viewed from a direction perpendicular to a plane of the photo-mask, edge 512 defines mask pattern 500.

Level-set function 514-1 has two values 516. Furthermore, edge 512 may correspond to a mid-point between these two values 516. In contrast, level-set function 514-2 has three values 518, and edge 512 may correspond to value 518-2. While not illustrated in FIG. 5, level-set functions 514 extend into the plane of FIG. 5 (e.g., they may be 3-dimension functions). As is known to one of skill in the art, there are many alternate level-set functions and/or configurations that may be used. For example, in some embodiments one or more separate level-set functions and/or separate patterns or images may be used for the features or defects.

As illustrated by level-set function 514-2, in some embodiments the level-set function may be expressed as a signed distance function relative to the contour or edge 512 (e.g., the value of the level-set function in at least a region is a function of the distance from the edge 512). This formulation may allow effects that occur nearer to the edge 512 (such as CD defects) to be highlighted. However, because features or defects in photo-masks may occur at random locations (including those far removed from edge 512), level-set function 514-1 may be useful in that it provides an equal weighting with respect to edge 512.

In some embodiments, during each iteration of inverse optical calculation 300 (FIG. 3) the level-set function corresponding to input 310 (FIG. 3) being modified is updated according to $$\phi_{i+1} = \phi_i + \Delta t \cdot \nabla(H),$$

where $\phi_{i+1}$ is an updated version of the level-set function, $\phi_i$ is the current version of the level-set function, $\Delta t$ is a step size in the calculation and $\nabla(H)$ is a gradient or a derivative of the error function. In an exemplary embodiment, $\nabla(H)$ is $$\left.\frac{\delta H}{\delta \phi}\right|_{\varphi_i},$$

i.e., it is the Frechet derivative of the error function H. Furthermore, in some embodiments $\nabla(H)$ is the direction of steepest descent for minimizing or optimizing H by changing $\phi$. Furthermore, in some embodiments a $1^{st}$ order and/or a $3^{rd}$ order Runge-Kutta method is used when updating $\phi_i$. In other embodiments, a Conjugate Gradient technique, a Levenberg-Marquardt technique, a Quasi-Newton technique, and/or a Simplex technique may be used.

At least some aspects of Simulated Annealing may be utilized in some embodiments of inverse optical calculation 300 (FIG. 3). In particular, the error function H may be allowed to increase during some steps as the calculation evolves. In this way, the global minimum in the multi-dimensional space may be determined. Note that the size of this multi-dimensional space may be a number of quantization levels to the power of the number of pixels in the mask pattern or the recovered inspection image. In an exemplary embodiment, the pattern or image has at least 1 million pixels (for example, 1024×1024).

In one embodiment, in any iteration of inverse optical calculation 300 (FIG. 3), changes in $\phi$ that decrease or increase the error function (H) up to 0.5% are performed. If a larger change will result (e.g., $\Delta H > 0.5\%$), the step size $\Delta t$ may be decreased by a factor that is at least greater than 1 and the change in $\phi$ is implemented (or not) based on a probability and a value P given by $$e^{\frac{-kH_{i+1}}{H_i}},$$

where $H_{i+1}$ is the error function in the $i+1^{th}$ iteration (if the change in $\phi$ is implemented) and $H_i$ is the error function in $i^{th}$ iteration (note that the ratio of $H_{i+1}/H_i$ equals $1+\Delta H$). In some embodiments k is 0.155. For example, if the value P is 0.3 and the probability is a random (or pseudorandom) number between 0 and 1 that is less than P, the error function may be increased before proceeding. In this way, inverse optical calculation 300 (FIG. 3) initially takes large steps and thereby explores the solution space.

Furthermore, in some embodiments, inverse optical calculation 300 (FIG. 3) is divided into a series of overlapping sub-problems (also referred to as 'work units') at least some of which are processed independently and/or concurrently. These work units may be based on elements or structures (for example, repetitive structures) in the mask pattern, the target pattern, and/or in one or more of the inspection images or aerial images. In some embodiments, the works units are selected such that there is a probability exceeding a pre-defined value (e.g., a high probability) that most if not all of the work units include at most one defect (for example, the work units may be based on differences between an aerial image and a simulated aerial image that is determined using the target mask pattern). Furthermore, in some embodiments the work units may partially overlap neighboring work units. For example, the work units may be between 10,000 $nm^2$ and 100 $\mu m^2$ in size.

In some embodiments, inverse optical calculation 300 (FIG. 3) is run for 30 or 100 iterations at which point the optimal solution has been determined. In other embodiments, the calculation is stopped based on convergence criteria, such as oscillatory behavior, a relative and/or absolute difference between the first aerial image (or the second inspection image) and images that result when the mask pattern (or the recovered inspection image) is projected through optical path 312 (FIG. 3), the latest change to the error function H, and/or the history of changes to the error function H. For example, the relative difference may be less than 1% and/or the absolute difference may be 10 nm for a critical dimension of 100 nm. Note that in some embodiments, the level-set function is re-distanced (i.e., restored to one having the distance function property relative to the edge 512) at intermediate iterations during inverse optical calculation 300 (FIG. 3). In an exemplary embodiment, such re-distancing occurs at least every 20 iterations (for example, every 14 iterations).

Using this inverse calculation approach, features smaller than the wavelength of the light source used to perform optical measurements or to print wafer patterns in a photolithographic process may be determined. For example, in simulations using a light source having a wavelength of 260 nm, features and defects as small as $(40 \text{ nm})^2$ on a photo-mask were determined.

Figure 6:
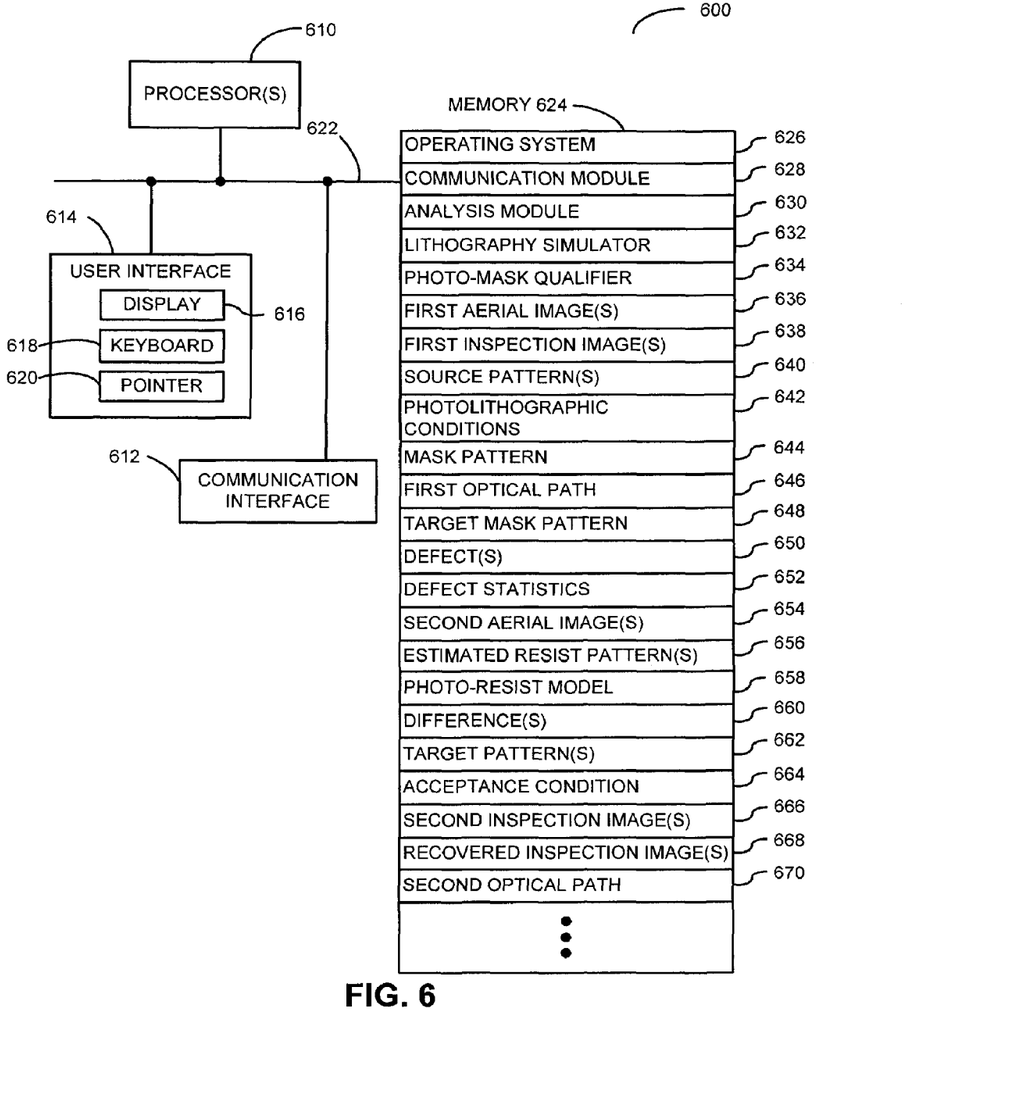
FIG. 6 is a block diagram illustrating a computer system in accordance with an embodiment of the present invention.

We now discuss computer systems for implementing the calculation technique. FIG. 6 presents a block diagram illustrating a computer system 600. Computer system 600 includes one or more processors 610, a communication interface 612, a user interface 614, and one or more signal lines 622 coupling these components together. Note that the one or more processors 610 may support parallel processing and/or multi-threaded operation, the communication interface 612 may have a persistent communication connection, and the one or more signal lines 622 may constitute a communication bus. Moreover, the user interface 614 may include a display 616, a keyboard 618, and/or a pointer 620, such as a mouse.

Memory 624 in the computer system 600 may include volatile memory and/or non-volatile memory. More specifically, memory 624 may include ROM, RAM, EPROM, EEPROM, flash, one or more smart cards, one or more magnetic disc storage devices, and/or one or more optical storage devices. Memory 624 may store an operating system 626 that includes procedures (or a set of instructions) for handling various basic system services for performing hardware dependent tasks. The memory 624 may also store procedures (or a set of instructions) in a communication module 628. The communication procedures may be used for communicating with one or more computers and/or servers, including computers and/or servers that are remotely located with respect to the computer system 600.

Memory 624 may also include multiple program modules (or a set of instructions), including: analysis module 630 (or a set of instructions), lithography simulator 632 (or a set of instructions), and/or photo-mask qualifier 634 (or a set of instructions). Note that one or more of these program modules (or sets of instructions) may constitute a computer-program mechanism. Furthermore, note that one or more of these program modules (or sets of instructions) may be implemented as a stand-alone software application, or as a program module or subroutine in another application, such as photo-mask inspection software.

Figure 7:
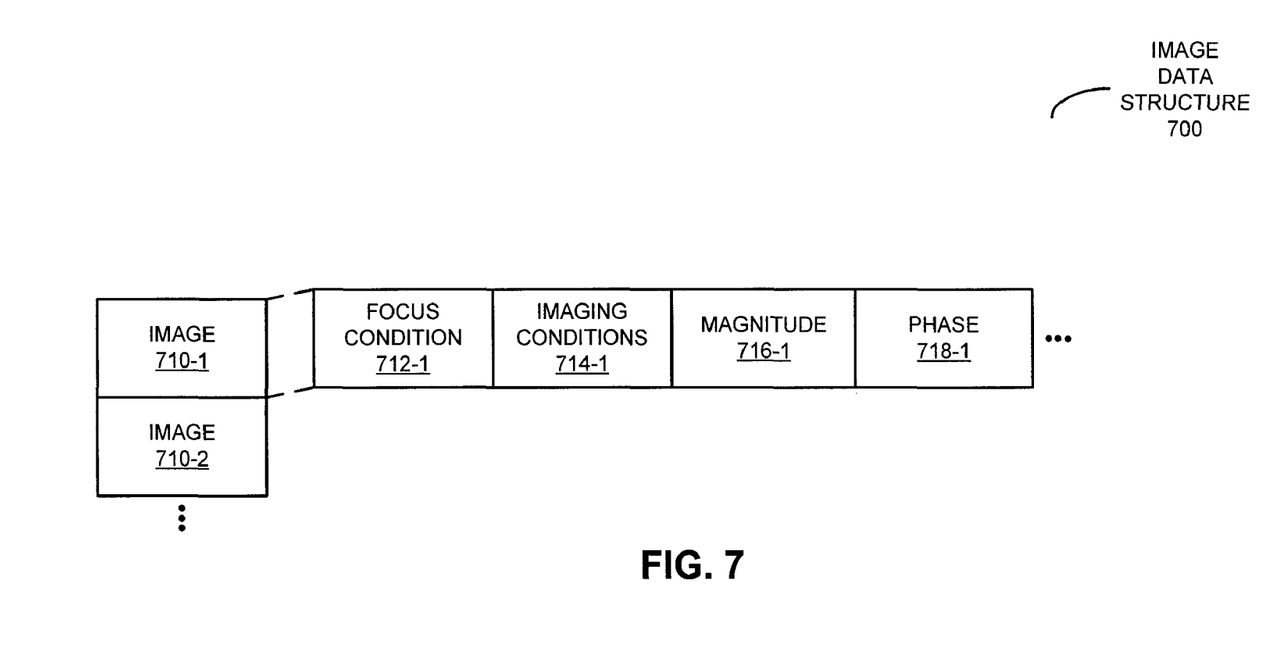
FIG. 7 is a block diagram illustrating an image data structure in accordance with an embodiment of the present invention.

During operation, computer system 600 may receive first aerial image(s) 636 and first inspection image(s) 638 associated with a photo-mask. Note that first aerial image(s) 636 may have been measured when the photo-mask was illuminated by one of source pattern(s) 640 and under photolithographic conditions 642. FIG. 7 presents a block diagram illustrating an image data structure 700. This image data structure may include information corresponding to one or more images 710 (such as first aerial image(s) 636 and first inspection image(s) 638). For a given image, such as image 710-1, image data structure 700 may include: a focal plane or focus condition 712-1 at which image 710-1 was acquired, other imaging conditions 714-1 at which the image was measured (such as a source pattern, a wavelength, etc.), and spatial variation in magnitude 716-1 and/or phase 718-1 information in image 710-1.

Referring back to FIG. 6, analysis module 630 may determine mask pattern 644 in an inverse optical calculation using first aerial image(s) 636, first inspection image(s) 638 and information about a first optical path 646 associated with aerial imaging system 210 (FIG. 2). In some embodiments, analysis module 630 further determines mask pattern 644 using target mask pattern 648. Furthermore, by comparing mask pattern 644 and target mask pattern 648, analysis module 630 may determine defect(s) 650 in mask pattern 644. In addition, defect(s) 650 may be identified using predetermined defect statistics 652 for the photo-mask or photo-masks that are fabricated using the same or a similar manufacturing process.

Next, lithography simulator 632 may calculate second aerial image(s) 654 in a forward optical calculation using mask pattern 644, another one of source patterns 640 and information about first optical path 646. This calculation may use photolithographic conditions 642. Furthermore, lithography simulator 632 may calculate estimated resist pattern(s) 656 using second aerial image(s) 654 and a photoresist model 658.

After these calculations are performed, photo-mask qualifier 634 may identify a difference(s) 660 (or features) between second aerial image(s) 654 and/or estimated resist pattern(s) 656 and target pattern(s) 662 (such as portions of a circuit), and may determine an acceptance condition 664 of the photo-mask based on the identified difference(s) 660.

In some embodiments, analysis module 630 recovers lost information in second inspection image(s) 666 and/or corrects for image artifacts in these inspection images. In particular, analysis module 630 may determine recovered inspection image(s) 668 in an inverse optical calculation using second inspection image(s) 666, target mask pattern(s) 648 and information about a second optical path 670 associated with optional optical-inspection system 226 (FIG. 2). These recovered inspection image(s) may be used to calculate second aerial image(s) 654.

Instructions in the various modules in memory 624 may be implemented in a high-level procedural language, an object-oriented programming language, and/or in an assembly or machine language. The programming language may be compiled or interpreted, i.e, configurable or configured to be executed, by the one or more processors 610.

In some embodiments, at least some of the information in memory 624 is encrypted. For example, the lithographic simulator 632 and/or its output files (such as estimated resist pattern(s) 656) may be encrypted so that integrated-circuit manufacturers are more willing to share this information with photo-mask shops (where photo-mask inspection may be performed). As discussed further below, in an alternate approach, the photo-mask shop may send the photo-mask images (e.g., first aerial image(s) 636, first inspection image(s) 638 and/or second inspection image(s) 666) to integrated-circuit manufacturers, who may perform wafer-pattern simulations and/or may determine photo-mask acceptance. Therefore, information 'stored' in memory 624 in FIG. 6 may be stored locally and/or at remote locations.

Although the computer system 600 is illustrated as having a number of discrete items, FIG. 6 is intended to be a functional description of the various features that may be present in the computer system 600 rather than as a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more ASICs, one or more field programmable gate arrays (FPGAs), and/or one or more digital signal processors (DSPs). In some embodiments the functionality of the computer system 600 may be implemented more in hardware and less in software, or less in hardware and more in software, as is known in the art.

In the preceding discussion, a 'computer system' may include a variety of devices, such as: a personal computer, a laptop computer, a mainframe computer, a portable electronic device, a server and/or a client computer (in a client-server architecture), and/or other device capable of manipulating computer-readable data or communicating such data between two or more computing systems over a network (such as the Internet, an Intranet, a LAN, a WAN, a MAN, or combination of networks, or other technology enabling communication between computing systems).

In some embodiments, photo-mask inspection and qualification system 200 (FIG. 2), inverse optical calculation 300 (FIG. 3), forward optical calculation 400 (FIG. 4), mask pattern 500 and corresponding level-set functions 514 (FIG. 5), computer system 600, and/or image data structure 700 (FIG. 7) include fewer or additional components. Furthermore, in these embodiments two or more components are combined into a single component and/or a position of one or more components may be changed.

As discussed previously, at least a portion of the calculation technique described may be implemented at a remote location. For example, the first aerial image, the first inspection image and/or the second inspection image may be measured at a first location, and then provided to computer system 600 at a second (remote) location. After calculating the second aerial image, identifying differences or features and/or determining an acceptance condition of the photo-mask, results may be reported back to the first location. This approach may allow photo-mask shops and integrated-circuit manufacturers to work together to determine whether or not a photo-mask is acceptable, or should be reworked or rejected. Historically, both parties have had reservations about such an arrangement. Photo-mask shops may be reluctant because it places the ability to reject a photo-mask in the hands of the end user (the integrated-circuit manufacturer), who may be cautious about accepting a photo-mask and may not have a financial motivation to accept a photo-mask that is less than optimal. In particular, since there is no cost to the end user, any potential defect may result in a photo-mask being rejected and the photo-mask shop may be forced to rewrite the photo-mask at their expense.

The approach described above may help resolve this conflict by creating a computational infrastructure that is agreed upon by both the photo-mask shop and the integrated-circuit manufacturer. In embodiments where photo-mask acceptance is fully automated, computer system 600 may be installed at the integrated-circuit manufacturer and images sent by the photo-mask shop may be processed without exposing the details of the integrated-circuit manufacturing process to the photo-mask maker, and yet at the same time without exposing the photo-mask shop to the human judgment of the integrated-circuit manufacturer in accepting or rejecting photo-masks.

Alternatively, the photo-mask shop may calculate the recovered inspection image from the second inspection image and/or may determine the mask pattern, either or both of which are then sent to the integrated-circuit manufacturer, where simulations of wafer patterns under various process conditions may be performed. The results may be sent back to the photo-mask shop, where they may be used to determine the disposition of defects (e.g., whether or not the photo-mask is acceptable). Therefore, the embodiments of the system and method described herein may be implemented by the photo-mask shop and/or by the integrated-circuit manufacturer.

While the preceding discussion used a photo-mask as an illustrative example, in other embodiments the calculation technique is applied to other types of images. For example, the calculation technique may be applied during the inspection and qualification of a patterned wafer (or semiconductor die) that is fabricated using a photolithographic or direct write process. In particular, a recovered wafer inspection image of the patterned wafer may be determined from a wafer inspection image (which may be obtained using optional wafer imaging system 222 in FIG. 2) and at least a portion of the target pattern. More generally, the calculation technique may be used in a wide variety of imaging and/or measurement applications that are based on wave phenomena propagating in different types of media (such as electromagnetic waves and sound waves) and at different ranges of wavelengths (such as audio, radio, microwave, infrared, visible, ultra violet, and x-ray).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for calculating an aerial image, comprising:
   receiving a first aerial image associated with a photo-mask illuminated by a first source pattern, wherein the photo-mask corresponds to a mask pattern, and wherein the photo-mask can include defects;
   determining, using a computer, the mask pattern based on the first aerial image and a first inspection image of the photo-mask, wherein the first inspection image has a higher resolution than the first aerial image, and wherein the first inspection image includes a spatial-variation of a magnitude of transmittance of the photo-mask; and
   calculating a second aerial image based on the determined mask pattern and a second source pattern that illuminates the determined mask pattern in calculation of the second aerial image, wherein the second source pattern is different from the first source pattern.

2. The method of claim 1, wherein the first aerial image is associated with an aerial image measurement system.

3. The method of claim 1, wherein the first aerial image is measured under conditions associated with a photolithographic process; and
   wherein the second aerial image is calculated using the conditions.

4. The method of claim 1, wherein the defects include a deviation in a magnitude of the transmittance of the photo-mask from that associated with a target mask pattern; and
   wherein the target mask pattern excludes the defects.

5. The method of claim 1, wherein the defects include a deviation in a phase of the transmittance of the photo-mask from that associated with a target mask pattern; and
   wherein the target mask pattern excludes the defects.

6. The method of claim 1, wherein the first inspection image includes a critical-dimension scanning-electron-microscope image of the photo-mask.

7. The method of claim 1, wherein the second source pattern includes a pixilated source pattern.

8. The method of claim 1, wherein the first source pattern includes one of a predefined group of source patterns; and
   wherein the second source pattern includes an arbitrary source pattern.

9. The method of claim 1, wherein the mask pattern is determined using an inverse optical calculation based on information about an optical path associated with an imaging system that measured the first aerial image.

10. The method of claim 9, wherein the second aerial image is calculated using a forward optical calculation based on the information about the optical path.

11. The method of claim 1, wherein the mask pattern is determined based on a target mask pattern that excludes the defects.

12. The method of claim 1, wherein the method further comprises calculating an estimated resist pattern based on the second aerial image and a model of a photoresist in a photolithographic process.

13. The method of claim 12, wherein the method further comprises:
   identifying differences between the estimated resist pattern and a target pattern; and
   determining an acceptance condition of the photo-mask based on the identified differences.

14. The method of claim 1, wherein the second aerial image is further determined based on a forward optical calculation associated with a recovered inspection image;

wherein the recovered inspection image is determined from a second inspection image associated with the photo-mask and a target mask pattern that excludes the defects; and wherein the recovered inspection image is characterized by additional spatial frequencies than the second inspection image.

15. The method of claim 14, wherein the second inspection image has a lower resolution than the first inspection image.

16. The method of claim 14, wherein the recovered inspection image is determined using an inverse optical calculation based on information about an optical path associated with an imaging system that measured the second inspection image.

17. The method of claim 1, wherein the method further comprises receiving a set of first aerial images, which include the first aerial image; and wherein the set of first aerial images are associated with different focal conditions in an imaging system that measured the set of first aerial images; and wherein the mask pattern is determined using the set of first aerial images.

18. The method of claim 1, wherein the method further comprises:

identifying differences between the second aerial image and a target pattern; and determining an acceptance condition of the photo-mask based on the identified differences.

19. A non-transitory computer-program product for use in conjunction with a computer system, the computer-program product comprising a computer-readable storage medium and a computer-program mechanism embedded therein to calculate an aerial image, the computer-program mechanism including:

instructions for receiving a first aerial image associated with a photo-mask illuminated by a first source pattern, wherein the photo-mask corresponds to a mask pattern, and wherein the photo-mask can include defects;

instructions for determining the mask pattern based on the first aerial image and a first inspection image of the photo-mask, wherein the first inspection image has a higher resolution than the first aerial image, and wherein the first inspection image includes a spatial-variation of a magnitude of transmittance of the photo-mask; and instructions for calculating a second aerial image based on the determined mask pattern and a second source pattern that illuminates the determined mask pattern in calculations of the second aerial image, wherein the second source pattern is different from the first source pattern.

20. A computer system, comprising:

at least one processor;

at least one memory; and at least one program module, the program module stored in the memory and configured to be executed by the processor to calculate an aerial image, the program module including:

instructions for receiving a first aerial image associated with a photo-mask illuminated by a first source pattern, wherein the photo-mask corresponds to a mask pattern, and wherein the photo-mask can include defects;

instructions for determining the mask pattern based on the first aerial image and a first inspection image of the photo-mask, wherein the first inspection image has a higher resolution than the first aerial image, and wherein the first inspection image includes a spatial-variation of a magnitude of transmittance of the photo-mask; and instructions for calculating a second aerial image based on the determined mask pattern and a second source pattern that illuminates the determined mask pattern in calculations of the second aerial image, wherein the second source pattern is different from the first source pattern.

* * * * *